G. E. CASSEL.
VARIABLE SPEED GEARING.
APPLICATION FILED SEPT. 25, 1916.
1,296,162.
Patented Mar. 4, 1919.
2 SHEETS—SHEET 2.
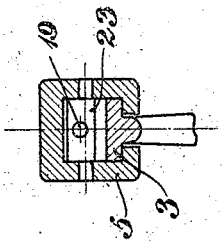
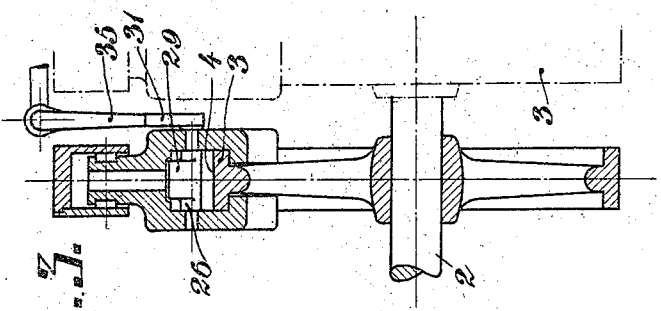
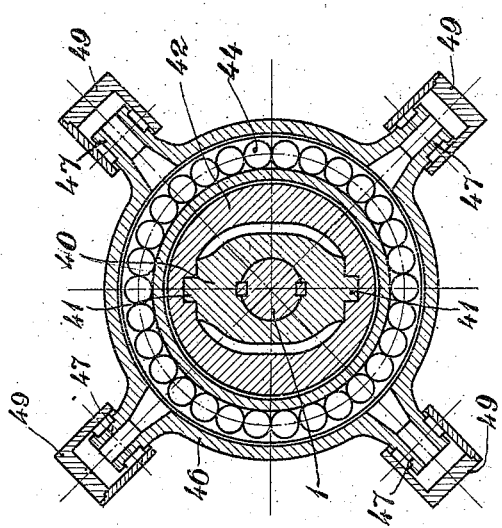
Inventor
Gunnar Elias Cassel,
By [signature] atty.

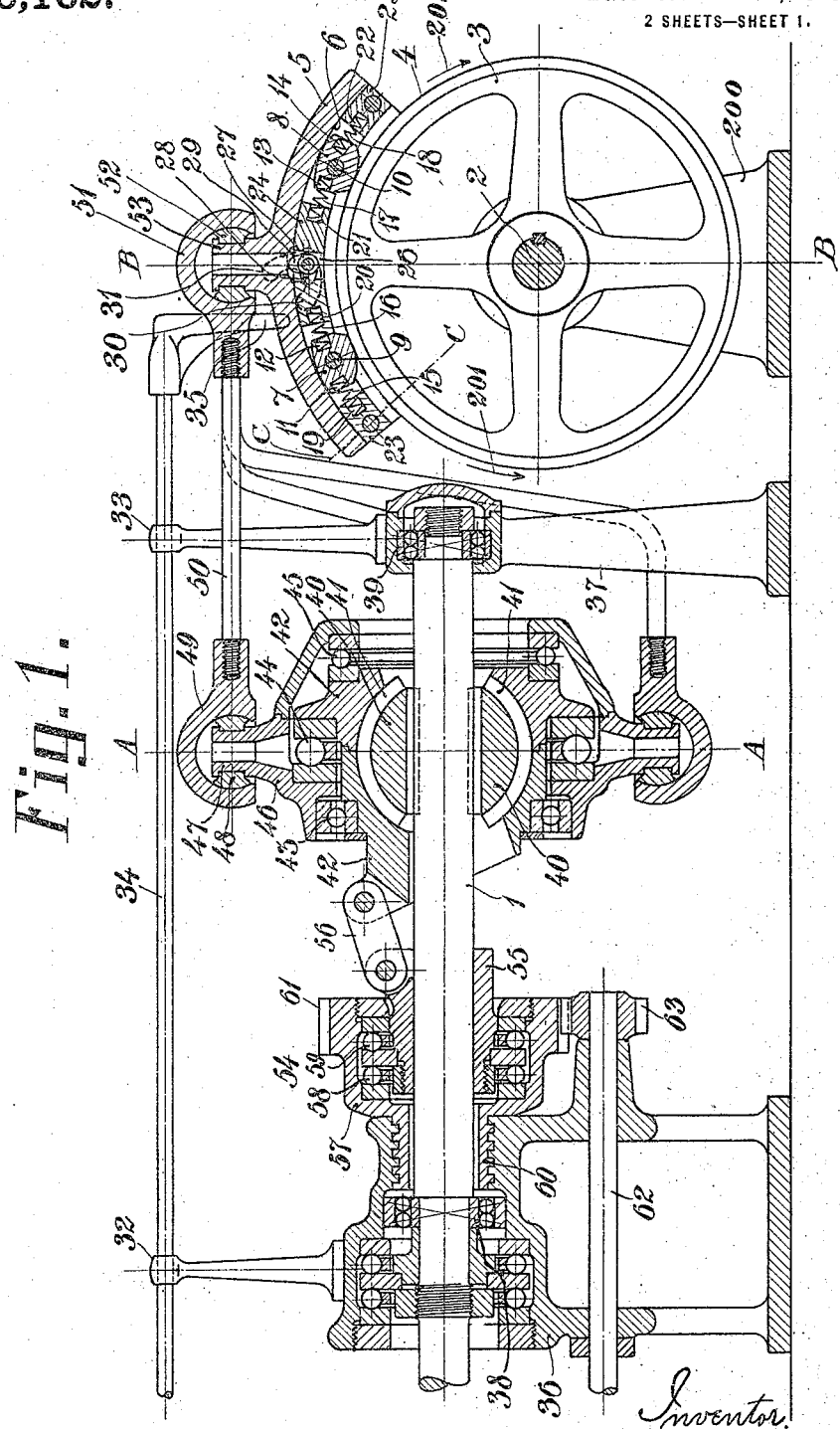

UNITED STATES PATENT OFFICE.

GUNNAR ELIAS CASSEL, OF STOCKHOLM, SWEDEN, ASSIGNOR TO ARTUR LEFFLER, OF DJURSHOLM, SWEDEN.

VARIABLE-SPEED GEARING.

1,296,162. Specification of Letters Patent. Patented Mar. 4, 1919.

Application filed September 25, 1916. Serial No. 121,984.

*To all whom it may concern:*

Be it known that I, GUNNAR ELIAS CASSEL, a citizen of the Kingdom of Sweden, residing at Stockholm, Sweden, have invented new and useful Improvements in Variable-Speed Gearings, of which the following is a specification.

This invention relates to a variable speed gearing by means of which a great ratio of gearing changeable within wide limits may be obtained with a small loss of power.

The object of the invention is the provision of a variable speed gearing of the said kind which, when running, may be easily adjusted for different speed and by means whereof large amounts of power may be transmitted. Owing thereto, the gearing is especially applicable as a power transmitting device between the engine and the driving wheels of vehicles, as for instance traction engines for agricultural purposes, artillery cars, automobiles, motor cycles and the like, as well as for working machines, in which the source of power consists of high speed motors, as electric motors or internal combustion engines, and in which an easy adjustment of the speed is desirable.

An embodiment of the invention is illustrated in the accompanying drawings in which:

Figure 1 is a longitudinal section of a variable speed gearing constructed according to the invention. Figs. 2, 3 and 4 are cross-sections on the lines A—A, B—B and C—C respectively in Fig. 1.

Like numbers of reference denote similar or corresponding parts throughout all figures.

Referring to Fig. 1, 1 designates a driving shaft, as for instance an engine shaft, from which movement is transmitted to a shaft 2 supposed to be the driving shaft of an automobile or other vehicle or the driving shaft of a working machine or the like.

Splined to the shaft 2, which is journaled in suitable frames 200, is a plurality of wheels 3 having cylindrical periphery 4. In the embodiment shown four wheels of that kind are supposed to be devised, one of which only is shown in Fig. 1. In Fig. 3 also a second similar wheel is indicated by dotted lines. Placed close to the rim of each wheel 3 and concentric therewith is an annular segment 5 adapted to swing to and fro along the rim of the wheel, Fig. 3, said annular segment being provided with an inner surface 6 concentric to the periphery of the wheel 3 and disposed at a certain distance from the surface 4. Situated in the space between the surfaces 4 and 6 are two friction pawls 7 and 8 journaled by means of pins 9 and 10 in the side walls of the annular segment 5, each of which pawls is adapted to turn the wheel 3 by being clamped between the surfaces 4 and 6 when the segment is moved in one direction, while, during the movement of the segment in the opposite direction, the pawl slides along the surface 4. The construction of the members 7 and 8 may be chosen at will. In the embodiment shown they are formed with curved frictional surfaces, whose radius of curvature is greater than half the distance between the surfaces 4 and 6, and on account thereof the members 7 and 8 may perform a partial rolling movement on the surfaces 4 and 6, and at the same time relatively large contact surfaces between the members 7 and 8 and the surfaces 4 and 6 are obtained. Owing thereto, a speedy and reliable engagement of the said members with the said surfaces is, on the one hand, insured, and, on the other hand, large amounts of power may be transmitted through the said frictional members without causing permanent deformations of the members or the surfaces 4 and 6 or fracture of the members.

The friction pawls 7 and 8 of each annular segment 5 are disposed differently, each of them being operative for one direction of movement. Therefore, they are so devised, that one of them is inoperative, while the other member is operative, and to that purpose the members, by being turned about their journal pins, may be brought out of contact with one of the surfaces 4 and 6, as for instance the surface 4, while they are in continuous contact with the other surface 6. To bring the members into or out of operative position the following device is disposed. At each side of the pin 9 or 10 each member 7 and 8 is provided with a recess forming the seat of a spring 15, 16, 17 and 18 respectively. The two outer springs 15 and 18 engage corresponding recesses 19, 22 respectively formed in members 23 which are secured at the ends of the annular segment, while the inner springs 16 and 17 engage corresponding recesses formed in a frame 24 placed between the members 7 and 8 and guided in the annular segment, said frame being adapted to move a certain distance in peripheral direction in the segment for the purpose mentioned below. The movement of the frame 24 is effected by means of a cam disk 27 placed with a certain play in a recess 26 in the frame and journaled in the annular segment, said cam disk being provided with two cams 28, 29, which are set at an angle of 90° in relation to each other and each of which is adapted to coöperate with one side of the recess 26. Outside the annular segment 5 the shaft of the cam disk 27 is provided with two arms 30 and 31 set at an angle of about 90° in relation to each other. A sliding rod 34 journaled in bearings 32, 33 and having a laterally extending arm 35, for each cam disk, may engage the arms 30, 31 for the reversal of the cam disks 27 (cfr. Fig. 3).

The device imparting the oscillating movement to the annular segments 5 supporting the friction pawls is constructed as follows: Splined to the driving shaft 1 journaled in bearings 38, 39, which are supported by frames 36, 37, is a member 40 having cylindrical form in the longitudinal section shown in Fig. 1, the axis of the cylinder forming right angles with said center-line, as will appear from Fig. 1. The member 40 is provided with two flanges 41 extending in the longitudinal direction of the shaft 1 and engaging corresponding grooves formed in a driving member 42 surrounding the member 40 and, preferably, consisting of several pieces, the member 42, consequently, being caused to rotate together with the member 40 and the shaft 1 but at the same time being adjustable at different angles of inclination in relation to the shaft 1. Journaled on the driving shaft by means of ball bearings 43, 44, 45 is a disk 46 also, preferably, consisting of several pieces. Said disk is provided with four projections 47 extending radially in relation to the shaft 1 and distributed equally about the periphery of the disk 46, i. e. disposed with a mutual angular distance of 90°. The projections 47 support journal members 48 having a cylindrical or spherical outer surface, inclosed by cups or sockets 49. Said cups or sockets are by means of rods 50 rigidly connected with similar cups or sockets 51 disposed at each of the four annular segments 5 of the wheels 3. Said latter cups 51 inclose in the same manner as the cups 49 journal members 52 secured to projections 53 extending from the annular segments 5. If the driving member 42 rotating with the shaft 1 be adjusted in an oblique position relatively to the shaft 1, said driving member will, during the rotation of the shaft 1, impart to the driving disk 46 not partaking in the said rotation an oscillating movement, which by the aid of the rods 50 is changed into a reciprocating movement of the angular segments 5.

The adjustment and the retention of the driving member 42 in oblique position in relation to the shaft 1 are effected by a thrust bearing 54 movable axially on the shaft 1. The inner portion 55 of said bearing rotating with the shaft is by a link 56 connected with the driving member 42 and consequently said member 42 will, on the axial movement of the bearing 54, be turned about the member 40 to a position more or less inclined in relation to the center line of the shaft 1. Placed between the said inner portion 55 of the bearing 54 and its outer supporting portion 57 are two rows of balls 58, 59, and on account thereof the bearing 54 may rotate, with small friction relatively to the portion 57.

To effect the axial movement of the bearing 54 in a simple and power saving manner and to adjust at the same time this movement accurately at will, the outer portion 57 of the bearing is provided with an axial extension 60 having outer threads engaging corresponding threads formed in the stationary frame 36, said outer portion 57 being at the outer periphery provided with teeth 61 gearing with a pinion 63, which is secured to an adjusting shaft 62. The said adjusting shaft is journaled in the frame 36 and may be turned by hand by means of a hand wheel or the like (not shown), so that the bearing, when the said shaft is turned, is screwed out of or into the threaded portion of the frame 36.

The device described above operates as follows:

In the positions of the different members shown in Fig. 1 no movement can be transmitted from the shaft 1 to the shaft 2, since the driving member 42 and the driving disk 46 occupy positions at right angles to the shaft 1 and, on account thereof, do not perform any oscillating movement on the rotation of the shaft.

If by turning the adjusting shaft 62, the portion 57 of the bearing be turned in such a manner, that said portion 57 is to a certain extent screwed out of the threaded part of the frame 36, the driving member 42 will, owing to the link connection with the bearing portion 57, be turned about the member 40 and, consequently, be adjusted to a certain oblique position relatively to the shaft 1. When then the driving member 42 is rotated with the shaft 1, said driving member will cause the non-rotating disk 46 to perform an oscillating movement in relation to the member 40 in such manner, that one oscillation is effected for each revolution of the shaft 1. Owing thereto, the rods 50 are so reciprocated, that each rod commences its movement a quarter of a period of movement later or earlier than the two adjacent rods. By means of the said rods the four annular segments 5 are caused to oscillate about the corresponding wheels 3, the movement of each separate annular segment likewise being preceding or succeeding a quarter of a period of movement in relation to the movement of the adjacent segments.

Supposing the cam disks 27 to assume the position shown in Fig. 1, in which the cams 28 engage the left side of the recesses 26, the frames 24 are moved to the left such a distance, that the springs 16 having normally no tension are capable, against the action of the springs 15 which are continuously under tension, so to turn the members 7 that they are brought out of contact with the working surface 4 of the corresponding wheel 3. Owing to the fact that on the movement of the frames 24 to the left, the springs 17 have not been actuated, the springs 18 will keep the members 8 in contact with the working surface 4 of the wheel 3. Consequently, when the annular segments 5 are moved in the direction of the arrow 201 in Fig. 1, the wheels 3 will be moved instantly, because the members 8 clamped between the working surfaces 4 and 6 on account of the pressure of the springs 18, are more strongly jammed because of the rolling movement. When the annular segments 5 are moved in the direction opposite to the arrow 201, the members 8 slide on the wheels 3 without moving them. Thus the wheels 3 and the shaft 2 are rotated in the direction of the arrow 201. By disposing in the manner described a plurality of successively operating friction ratchet gears, the use of each rod 50 may be limited to that part of the stroke of the rod, during which the speed of the rod is substantially constant, thus effecting a practically uniform rotation of the shaft 2.

The speed of rotation of the shaft 2 in relation to that of the shaft 1 may be varied, by changes of the inclination of the driving member 42 relatively to the shaft, from a very small value to a maximum value corresponding to the limit value of the inclination of the driving member 42 toward the shaft 1.

If the shaft 2 is to be rotated in the opposite direction, the rod 34 is so adjusted, that its arms 35 reverse the projections 31 to the right, Fig. 1, thus causing the cams 29 to engage the right side of the recesses 26 and moving the frames 24 a distance in the same direction corresponding to the height of the cams. The spring 17 of each annular segment is compressed, and the member 8 is brought out of engagement with the surface 4 against the action of the spring 18. The spring 16 is released, and the spring 15 is now capable of turning the member 7 to engagement with the surface 4. When the annular segments 5 are moved in the direction of the arrow 202, the members 7 clamped between the surfaces 4 and 6 will by rolling movement be still more jammed between said surfaces, and on account thereof the wheels 3 are moved in the said direction. When the annular segments 5 are moved in the direction of arrow 201, the members 7 slide on the wheels 3 without moving them. In this case the shaft 2 is rotated in the direction of arrow 202, and the speed of rotation in relation to the speed of the shaft 1 may be varied by adjusting the driving member 42 to more or less inclined position relatively to the shaft 1.

Having now described my invention, what I claim as new and desire to secure by Letters Patent is:

1. A variable speed gearing, comprising a ratchet gear, an oscillating driving disk actuating said ratchet gear, a rotating driving shaft, a driving member actuating said driving disk and adapted to be adjusted in different inclination to said driving shaft, a thrust bearing movable axially on said driving shaft, a portion of said thrust bearing rotating with said driving shaft, a connection between said rotating portion and said driving member, a portion of said thrust bearing being adjustable in relation to the shaft, a threaded member integral with said adjustable portion, a stationary threaded frame engaging said threaded member, and means for turning said threaded member in said frame.

2. A variable speed gearing, comprising a ratchet gear, a driving shaft, driving means mounted on said driving shaft and actuating said ratchet gear, a thrust ball bearing movable axially on said driving shaft, a threaded portion of said thrust bearing, a stationary nut engaging said threaded portion, a portion of said thrust bearing adjustable in relation to the shaft, a toothed wheel integral with said adjustable portion, a pinion gearing with said toothed wheel, and a shaft adapted to turn said pinion.

3. A variable speed gearing, comprising a driven shaft, a plurality of ratchet gears mounted on said shaft and having friction members operating in opposite directions in said ratchet gears, means for bringing said friction members into and out of operation, an oscillating driving disk, connections between symmetric points of said driving disk and each of the ratchet gears, a driving shaft, a driving member mounted on said driving shaft and adapted to assume different inclined positions in relation to the driving shaft, said driving member actuating said driving disk, a thrust bearing movable axially on said driving shaft, a connection between symmetric points of said driving disk and each of the ratchet gears, a portion of said thrust bearing rotating with said driving shaft, a connection between said stationary portion and said driving member, another portion of said thrust bearing being adjustable in relation to said driving shaft, threads on said stationary portion, a nut engaging said threads, a toothed wheel integral with said adjustable portion, a pinion gearing with said toothed wheel and a shaft adapted to turn said pinion.

4. A variable speed gearing, comprising a driven shaft, a plurality of rachet gears mounted on said shaft and provided with friction members operating in opposite directions, means for bringing said friction members into and out of operation, a driving shaft, a driving disk mounted on said driving shaft, a driving member rotating with said driving shaft and supporting the driving disk, said driving member being adapted to assume different inclined positions in relation to the driving shaft, connections between said driving disk and driving member causing the disk to assume correspondingly inclined positions, a thrust bearing movable axially on said driving shaft, a portion of said thrust bearing rotating with said driving shaft, a connection between said rotating portion and said driving member, another portion of the thrust bearing being adjustable axially in relation to the driving shaft, threads on said adjustable portion, a nut engaging said threads, a toothed wheel integral with said adjustable portion, a pinion engaging said toothed wheel, and a shaft adapted to turn said pinion.

5. A variable speed gearing, comprising a driven shaft, a plurality of ratchet gears oscillating on said shaft and each carrying a number of spring-actuated friction clutch members operative in either direction of movement of said ratchet gears, means for reversing the operative direction of said clutch members, a driving shaft, a driving disk mounted on said driving shaft, a driving member rotating with said driving shaft and supporting the driving disk, said driving member being adapted to assume different inclined positions in relation to the driving shaft, connections between said driving disk and driving member causing the disk to assume correspondingly inclined positions, a thrust bearing movable axially on said driving shaft, a portion of said thrust bearing rotating with said driving shaft, a connection between said rotating portion and said driving member, another portion of the thrust bearing being adjustable axially in relation to the driving shaft, threads on said adjustable portion, a nut engaging said threads, a toothed wheel integral with said adjustable portion, a pinion engaging said toothed wheel, and a shaft adapted to turn said pinion.

In testimony whereof I have signed my name.

GUNNAR ELIAS CASSEL.